United States Patent [19]

Nomura

[11] Patent Number: 4,527,663
[45] Date of Patent: Jul. 9, 1985

[54] APPARATUS FOR CONTROLLING AN AC POWER ELEVATOR

[75] Inventor: Masami Nomura, Nagoya, Japan

[73] Assignee: Mitsubishi Denki Kabushiki Kaisha, Tokyo, Japan

[21] Appl. No.: 498,871

[22] Filed: May 25, 1983

Related U.S. Application Data

[63] Continuation-in-part of Ser. No. 442,045, Nov. 16, 1982.

[30] Foreign Application Priority Data

Nov. 24, 1981 [JP] Japan ................. 56-188023

[51] Int. Cl.³ .............................. B66B 5/00
[52] U.S. Cl. ................. 187/29 R; 318/266; 318/267; 318/436; 318/739; 307/66; 307/77
[58] Field of Search .............. 187/29, 29 ES; 307/66, 307/77; 318/112, 739, 740, 257, 266, 267, 436

[56] References Cited

U.S. PATENT DOCUMENTS

| | | | |
|---|---|---|---|
| 3,428,878 | 2/1969 | Stainken | 187/29 R X |
| 4,108,281 | 8/1978 | Glaser | 187/29 R |
| 4,376,471 | 3/1983 | Uchino et al. | 187/29 R |
| 4,436,184 | 3/1984 | Dorman et al. | 187/29 R |
| 4,436,185 | 3/1984 | Ludwig et al. | 187/29 R |

FOREIGN PATENT DOCUMENTS

| | | |
|---|---|---|
| 994204 | 6/1965 | United Kingdom . |
| 1116023 | 12/1965 | United Kingdom . |
| 1466238 | 3/1977 | United Kingdom . |
| 2068663 | 8/1981 | United Kingdom . |
| 2111251 | 6/1983 | United Kingdom ............ 187/29 D |

Primary Examiner—William M. Shoop
Assistant Examiner—Paul Shik Luen Ip
Attorney, Agent, or Firm—Wenderoth, Lind & Ponack

[57] ABSTRACT

An apparatus for controlling an AC powered elevator and for improving the safety of the operation of the elevator includes: a three-phase AC power source; a drive device connected to the three-phase AC power source for converting an AC signal into an AC power having a variable frequency, thereby enabling the controlling of an induction motor; a winding induction motor connected to and controlled by the drive device for driving the cage of the elevator; a door induction motor connected to and controlled by the drive device for opening or closing the cage door provided at the cage of the elevator; and a motor control command device having an operation command generator which generates a command for starting or stopping the cage of the elevator so as to control the drive device and a door command generator which generates a command for opening or closing the cage door so as to control the drive device for independently controlling the winding induction motor and the door induction motor.

11 Claims, 13 Drawing Figures

APPARATUS FOR CONTROLLING AN AC POWER ELEVATOR

CROSS REFERENCE TO RELATED APPLICATIONS

This application is a continuation-in-part of now abandoned application Ser. No. 442,045, filed Nov. 16, 1982.

BACKGROUND OF THE INVENTION

The present invention relates to an improved apparatus for controlling an AC power elevator.

A control circuit for a power elevator which employs induction motors for a winding motor and a door motor is shown in FIG. 1.

In FIG. 1, a three-phase AC power source is connected to terminals 1; a drive device 2 is connected to the AC power source at the terminals 1 and is composed of a thyristor, a power transistor, and an electromagnetic contactor, etc.; a winding three-phase induction motor 3 is connected to the drive device 2; a brake wheel 4 is coupled to the motor 3; a brake shoe 5 is provided to face with the outer periphery of the brake wheel 4 and applies a brake force to the brake wheel 4 by the force of a spring (not shown); a brake coil 6 separates the brake shoe 5 from the brake wheel 4 against the force of the spring when the coil 6 is energized; a drive sheave 7 is driven by the motor 3 for a winch; a main rope 8 is engaged on the sheave 7; a cage 9 is coupled to one end of the main rope 8; a cage door 10 opens or closes the entrance of the cage 9; a three-phase induction motor 11 drives the cage door 10 to open or close the cage door 10; a balancing weight 12 is coupled to the other end of the main rope 8; a door motor drive device 13 is inserted between the power source 1 and the motor 11 and is composed of a thyristor, a power transistor, an electromagnetic contactor, etc.; an operation command generator 14 generates a command to start or stop the motor 3 so as to control the gate or the thyristor or the base of the transistor of the drive device 2; and a door command generator 15 generates a command to start or stop the motor 11 so as to control the drive device 13 in a fashion similar to that of the generator 14.

An example of the concrete structure of the drive device 2 is shown in FIG. 2.

In FIG. 2, terminals R, S and T are connected to a three-phase AC power source 1; a rectifier 101 converts a three-phase AC power source voltage into a DC voltage; a smoothing capacitor 102 smooths the DC output of the rectifier 101; an inverter 103 of widely known pulse width modulation type is connected to the DC side of the rectifier 101 and converts a predetermined DC voltage into an alternating current having a variable voltage and variable frequency under the pulse width control; the winding three-phase induction motor 3 is driven by the inverter 103; an inverter 112 for electric power regeneration is connected between the power source at the terminals R, S and T and the output side of the rectifier 101; normally open contacts 118a–118c of the electromagnetic contactor for operation are energized when the cage 9 is started and are deenergized when the cage 9 is stopped; and normally open contacts 119a–119c of the electromagnetic contactor are energized after the contacts 118a–118c of the electromagnetic contactor are energized, and are deenergized after the contacts 118a–118c are deenergized.

FIG. 3 shows an internal circuit diagram of the rectifier 101, wherein the rectifier 101 consists of diodes $D_1$–$D_6$. The rectifier output of the rectifier 101 is smoothed, and is supplied to the inverter 103 illustrated in FIG. 4. In FIG. 4, diodes are connected reversely to transistors $Q_1$–$Q_6$; and the inverter is arranged such that the transistors $Q_1$–$Q_6$ sequentially conduct in the operating direction by means of the voltage applied to the bases of the transistors. FIG. 4A shows an electric power regenerative inverter 112. When a cage 9 is regeneratively braked, the AC current generated by a motor 3 is converted by an inverter 103 into a direct current, which is converted to an alternating current by causing the thyristors of the inverter 112 to sequentially conduct, thereby generating a power source voltage.

The drive device 2 is thus constructed. A variety of concrete arrangements of the drive device 13 for the door motor can be considered, and may be constructed in a fashion which is similar to that of the drive device 2.

The detailed circuit diagram of the operation command generator 14 is shown in FIG. 5. This circuit mainly consists of a calling button switch 218, a car direction command generator 219, and a frequency and phase order signal generator 200.

In FIG. 5, when the button switch 218 conducts, a power source voltage Vcc is applied to a speed pattern circuit (SP) so as to charge a capacitor $C_1$ through a resistor $R_1$. In this manner, a charging voltage VP shown in FIG. 6 can be obtained. The charging voltage Vp due to the conduction of the button switch 218 is applied to a voltage controlled oscillator 223, which in turns generates an output pulse 222a which is responsive to the voltage Vp.

FIG. 7 shows the waveform diagram of the output pulses at the respective sections in FIG. 5. The output pulse 222a is supplied to a 6 stage Up/Down Counter 224, which in turn generates the output pulses 224a, 224b and 224c shown in FIG. 7. These output pulses 224a, 224b, 224c are formed by a logic IC, and signals 226a to 231a are generated from a decoder 235 which operates in accordance with the truth table shown in the Table I, thereby controlling the inverter 103.

The counter 224 receives a car direction command signal from the car direction command generator 219. The power source voltage Vcc is applied to the counter 224 when the contact (UP) is closed, thereby rotating the induction motor 3 so as to lift the cage of the elevator. When the contact (DN) is closed, the cage is lowered.

More particularly, the output pulses 226a–231a shown in FIG. 7 are outputted from OR gates 226–231, and are used as the gate pulses of the transistors $Q_1$–$Q_6$ of the inverter 103, and the inverter 103 generates the AC power having variable voltage and variable frequency of the phase order corresponding to the car direction.

The operation command generator 14 is thus constructed, thereby controlling the inverter 103 of the drive device 2 and driving the winding induction motor 3.

The door command generator 15 may be constructed in the same manner as the operation command generator 14, and when the generator 15 is constructed in the same manner as the generator 14, the car direction command generator 219 in FIG. 5 may be used as the door opening or closing command generator in such a manner that the UP switch is used as the door OPEN switch, and the DOWN switch is used as the door CLOSE switch. In this case, Vp in FIG. 6 becomes the door opening or closing speed command.

The control circuit for the elevator thus constructed controls the motor 3 by the operation command generator 14 and the drive device 2, thereby starting the cage 9, and the cage 9 is moved to the story to be called and is then stopped. When the cage 9 is stopped, the motor 11 is controlled by the door command generator 15 and the drive device 13, thereby opening the cage door 10. When a predetermined period of time (such as 4 seconds) has elapsed after the cage door 10 is opened, the motor 11 is controlled by the drive device 13, thereby closing the cage door 10. When another calling is generated from another story, the motor 3 is again controlled by the drive device 2, and the cage 9 starts moving.

In this manner, unless a high class elevator is employed, the opening or closing period of the cage door 10 and the operation period of the cage 9 are controlled so as not to be superimposed. Therefore, when induction motors are used for the winding motor 3 and the door motor 11, it is not economical to accommodate the exclusive drive device 13 as the door motor 11.

SUMMARY OF THE INVENTION

The present invention enables the avoidance of the above-mentioned drawbacks and its object is to provide an inexpensively constructed control apparatus for controlling an AC powered elevator, which commonly uses the drive device for both a winding induction motor and for a door induction motor.

Another object of the present invention is to provide a control apparatus for controlling an AC powered elevator, which can effectively prevent the cage door of the elevator from opening during the moving of the cage thereby improving its safety.

Still another object of the present invention is to provide a control apparatus for controlling an AC powered elevator, which can prevent passengers from being enclosed in the cage of the elevator.

In order to perform the above-described and other objects, there is provided according to the present invention a control apparatus for controlling an AC powered elevator which comprises: a three-phase AC power source; a drive device connected to the three-phase AC power source for converting an AC signal into AC power having a variable frequency, thereby controlling an induction motor; a winding induction motor connected to and controlled by the drive device for driving the cage of the elevator; a door induction motor connected to and controlled by the drive device for opening or closing the cage door provided at the cage of the elevator; and a motor control command device having an operation command generator which generates a command for starting or stopping the cage of the elevator to control the drive device and a door command generator which generates a command for opening or closing the cage door to control the drive device for independently controlling the winding induction motor and the door induction motor.

BRIEF DESCRIPTION OF THE DRAWINGS

The same reference numerals in the respective drawings denote the same or equivalent parts and components.

DESCRIPTION OF THE PREFERRED EMBODIMENTS

Figure 1:
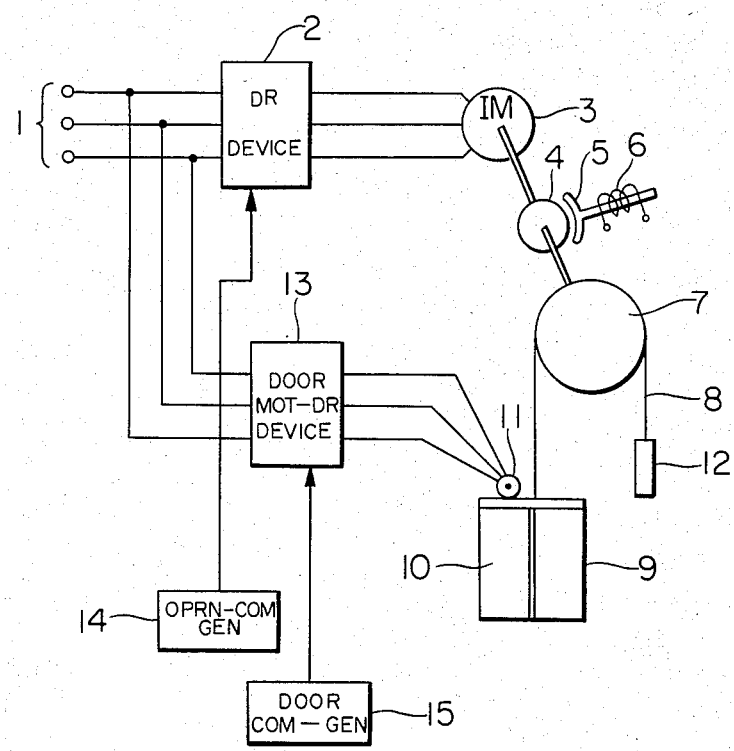
FIG. 1 is a circuit diagram showing a conventional apparatus for controlling an AC powered elevator.
Figure 2:
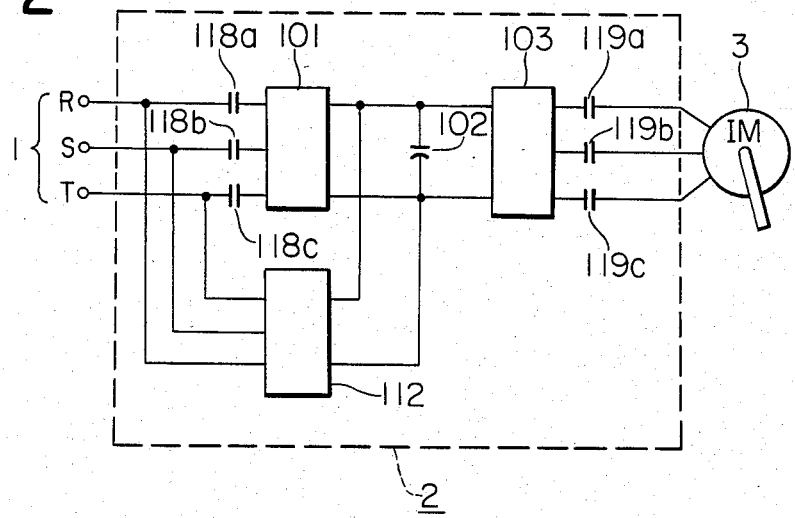
FIG. 2 is a circuit diagram illustrating a drive device.
Figure 3:
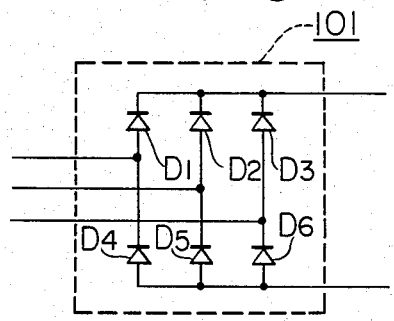
FIG. 3 is a circuit diagram showing a rectifier.
Figure 4:
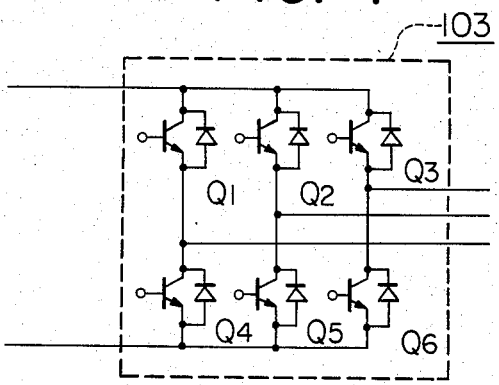
FIG. 4 is a schematic circuit diagram of an inverter.
Figure 4A:
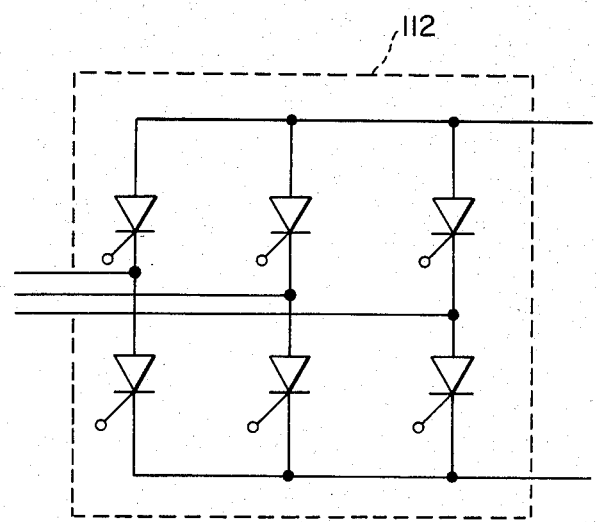
FIG. 4A is a circuit diagram of a regenerative inverter.

An embodiment of the invention will be described below in conjunction with FIG. 8, wherein the parts and components except those are similar to those in FIG. 1 and the same reference numerals as those in FIG. 1 denote the same or equivalent parts and components.

Figure 8:
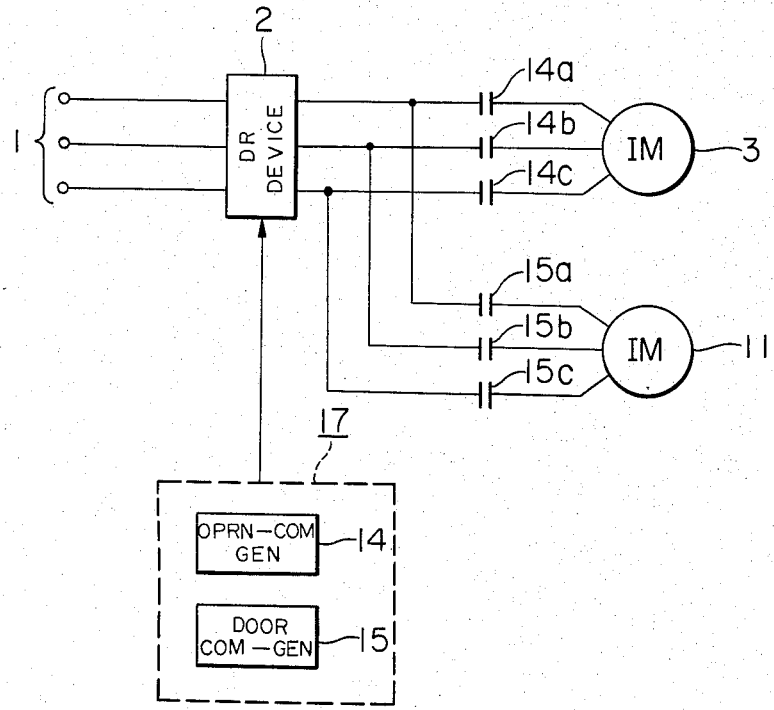
FIG. 8 is a circuit diagram showing an embodiment of an apparatus for controlling an AC powered elevator.

In FIG. 8, contacts 14a–14c of an electromagnetic contactor are inserted between the drive device 2 and the motor 3 and are closed by the command of the operation command generator 14 during the movement of the cage 9 and are opened while the cage door 10 is controlled; contacts 15a–15c of an electromagnetic contactor are inserted between the drive device 2 and the motor 11 and are closed by the command of the door command generator 15 during the control of the cage door 10 and is opened during the movement of the cage 9; and a motor control command device 17 consists of an operation command generator 14 and a door command generator 15.

Figure 5:
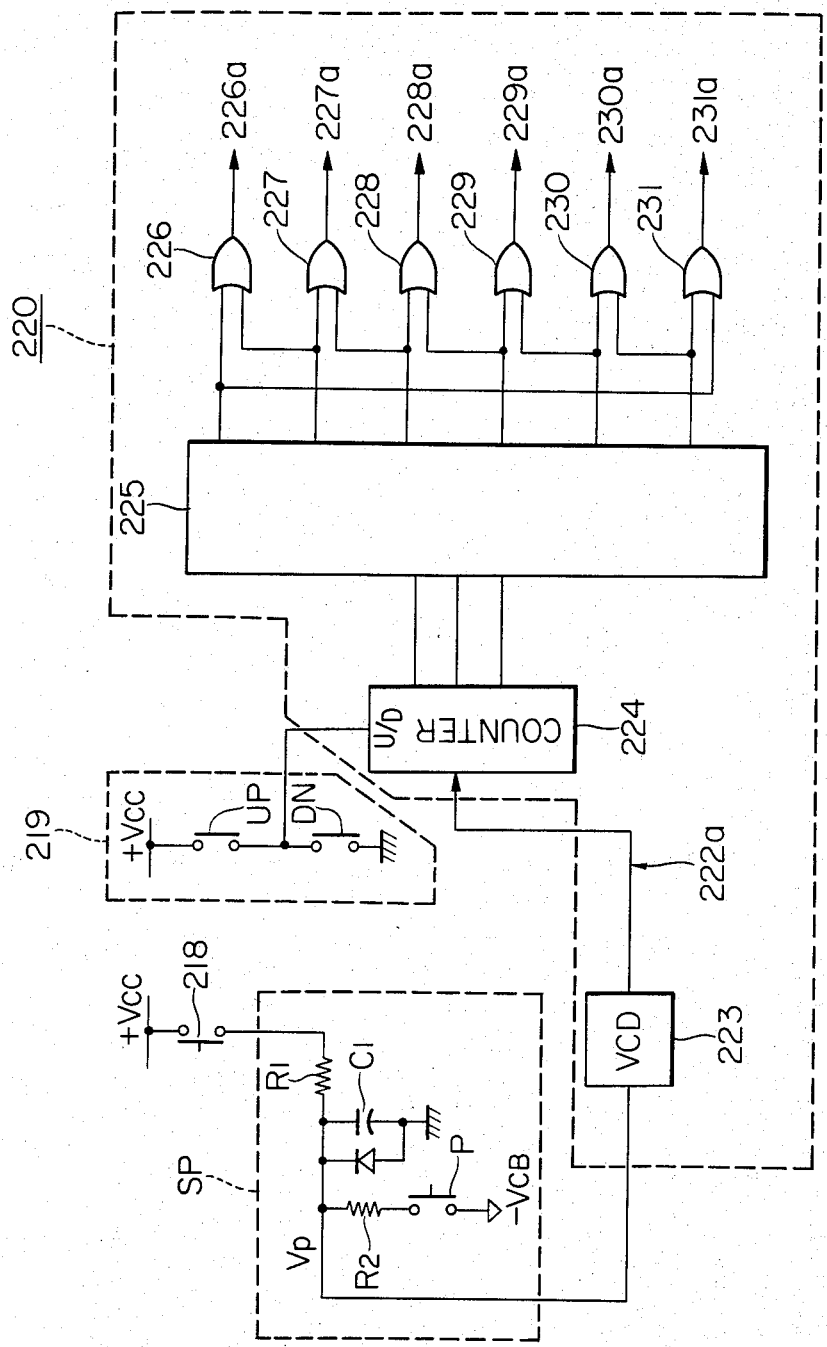
FIG. 5 is a detailed circuit diagram illustrating an operation command generator.
Figure 6:
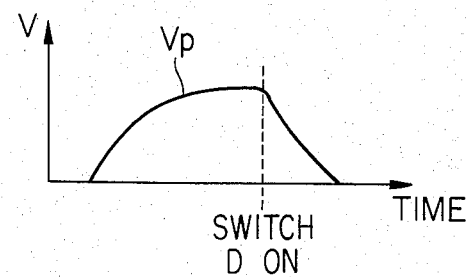
FIG. 6 is a diagram illustrating the waveform of the charging voltage Vp.
Figure 7:
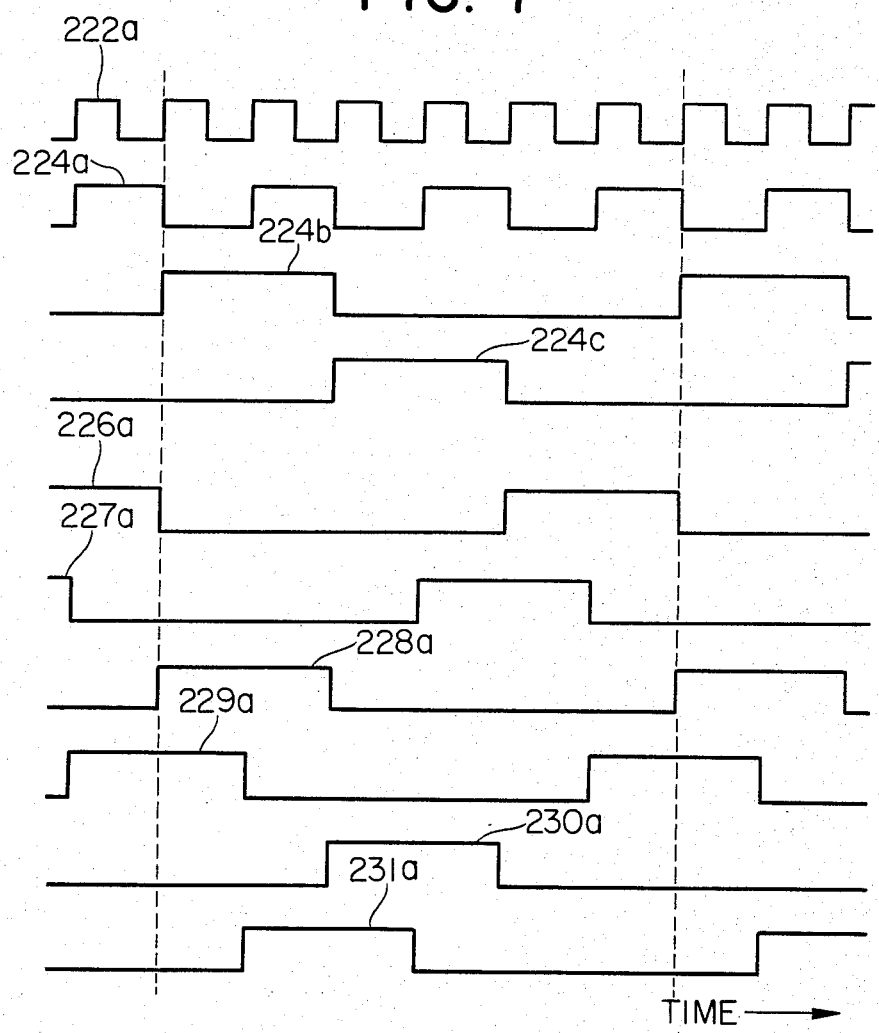
FIG. 7 is a diagram illustrating the waveform of the output pulses of the sections of the circuit in FIG. 5.
Figure 8A:
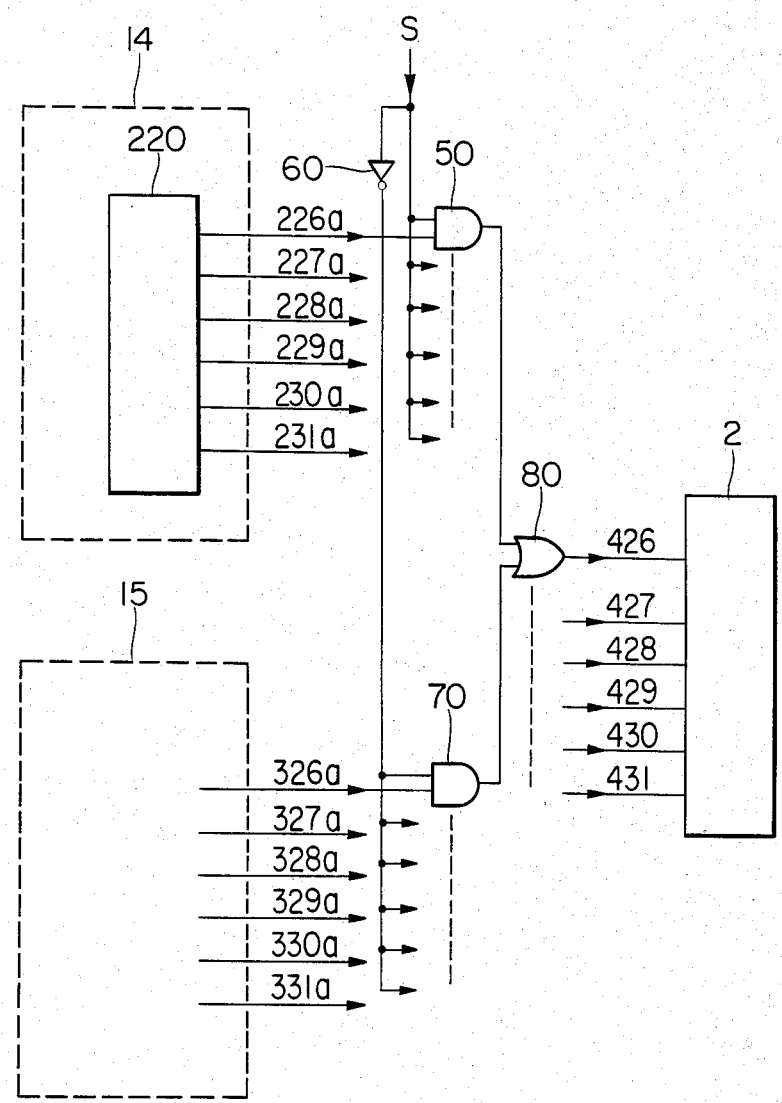
FIG. 8A illustrates, in greater detail, a portion of the embodiment illustrated in FIG. 8.

The operation command generator (14) and the door command generator (15) are as shown in FIG. 5. The operation command generator (14) outputs signals (226a)–(231a) which are generated by the frequency and phase order command generator (220), these signals being supplied to one input terminals of AND gates (50)—although only one of such gates is shown in FIG. 8A. To the other input terminals of the AND gates (50)—, there are supplied a signal S going high when the cage (9) travels. A drive signal is usually generated in the elevator for initiating the running of the cage when the cage door, hall door and so forth are completely closed and thus ready for starting. This drive signal may, for example, be employed as the aforementioned signal S.

This signal S is inverted by an inverter 60 and thence supplied to one set of input terminals of AND gates (70)—. To the other terminals of the AND gates (70)—, there are supplied output signals (326a)–(331a) from a device (not shown) similar to the aforementioned phase order command generator (220).

Assuming that the output (226a) is produced when the signal S is high, the AND gate (50) outputs a signal which is transmitted through an OR gate (80) to the drive device (2) as signal (426). Upon reception of the signal (426), the drive device (2) operates in the same manner as described above for driving the motor (3) and causing the cage (9) to travel.

When the signal S is low, the AND gates (50)—do not produce any outputs because one of their inputs remains low.

The detailed circuits and the operation of the respective sections are similarly arranged to thos of the apparatus in FIG. 1.

The operation of this embodiment will be described below.

The contacts 14a–14c of the electromagnetic contactor are closed by the command of the command device 17 during the operation of the cage 9, and the contacts 15a–15c are opened. Therefore, the motor 3 is controlled by the drive device 2, and the cage 9 is started or stopped. When the cage 9 is stopped, the contacts 14a–14c are again opened by the command of the command device 17, and the contacts 15a–15c are closed. In this manner, the motor 11 is controlled by the drive device 2, and the cage door 10 is opened or closed. When the cage door 10 is closed, the contacts 15a–15c are again opened by the command of the command device 17, and the contacts 14a–14c are closed, thereby controlling the motor 3. More particularly, the command device 17 and the drive device 2 are operated to independently control both the motors 3 and 11. Therefore, an exclusive device for controlling the motor 11 can be eliminated.

The same signal is inverted by the inverter (60) to the high state and is supplied to the AND gates (70)—. Assuming that the signal (326a) is produced, the AND gate (70) outputs a signal which is transmitted through OR gate (80) to the drive device (2) as signal (426). The drive device (2) activates the motor (11) for operating the door (10).

The inputs signals (427)–(431) which are supplied to the drive device (2) represent signals generated in conjunction with the signals (227a)–(231a) when the signal S is high, or signals generated in conjunction with the signals (327a)–(331a) when the signal S is low.

Figure 9:
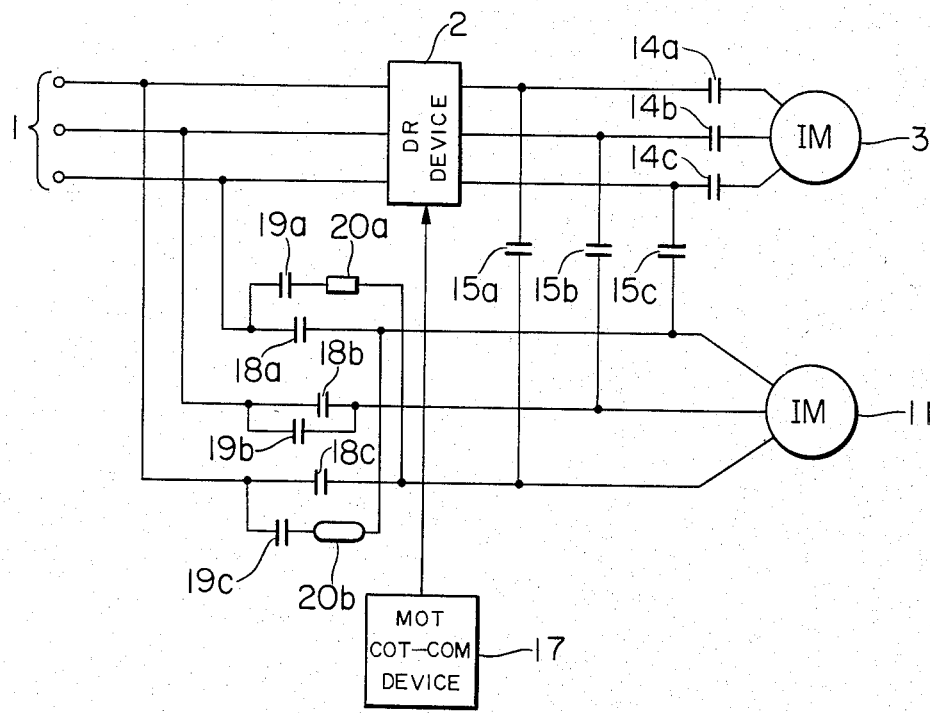
FIG. 9 is a circuit diagram showing another embodiment of the present invention.

FIG. 9 shows another embodiment of the present invention, wherein the parts and the components except those shown are similarly constructed to those in FIG. 9.

In FIG. 9, contacts 18a–18c of an electromagnetic contactor for forcibly opening the cage door 10 are inserted between the power source 1 and the motor 11 for closing the cage door 10 when the cage 9 reaches within the section capable of opening the door on the floor of the story and a predetermined period of time (such as 2 seconds) has elapsed; contacts 19a–19c of an electromagnetic contactor for holding the door closure of the cage are provided corresponding to the contacts 18a–18c and are connected to switch the phase of the power source and close during the running of the cage 9; and resistors 20a and 20b are respectively connected to the contacts 19a and 19c.

More particularly, when the cage 9 is running, the contacts 19a–19c are closed. Therefore, a voltage is applied to the motor 11 irrespective of the operation of the drive device 2, and a pushing force is applied to the cage door 10 disposed at the closed position. In this manner, the cage door 10 is prevented from opening due to any reason during the running of the cage 9. The resistors 10a and 20b are for limiting a current at the time of pushing the cage door 10. Since the contacts 19a–19c are not interposed via a complicated device such as the drive device 2, the operations are effective, and a stable pushing force can be maintained.

When the cage 9 is stopped in the zone capable of opening or closing the door of the floor of the story due to the defect of the command device 17 or the drive device 2 and a predetermined period of time has elapsed but the cage door 9 is not opened, the contacts 18a–18c are closed. In this manner, since the motor 11 rotates in the direction of opening the door, the cage door 10 is opened. Therefore, passengers may not be enclosed in the cage 9.

Figure 10:
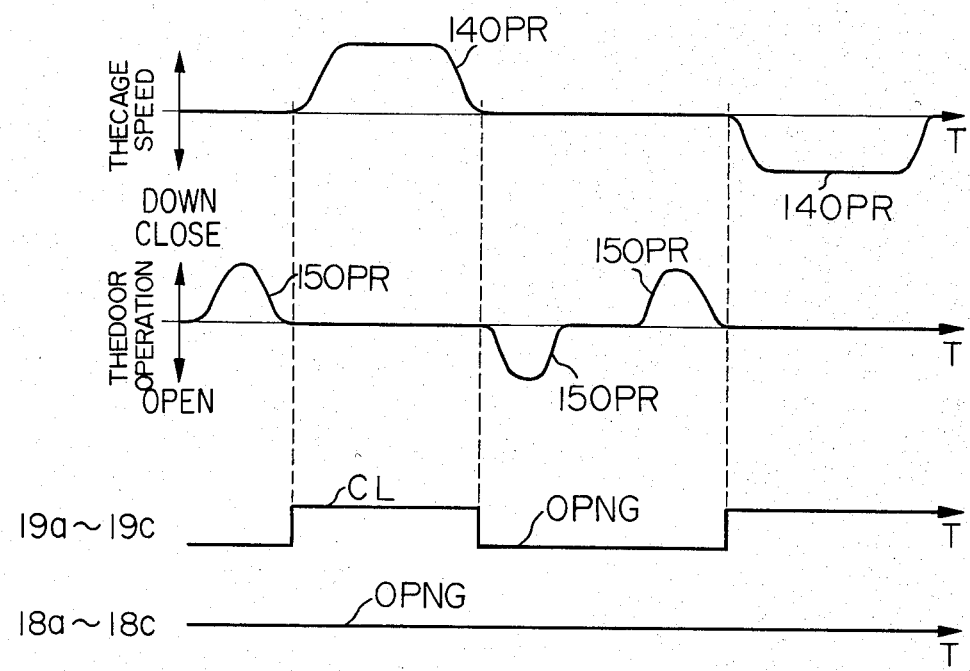
FIGS. 10 and 11 are timing charts for explaining the operations of the embodiment shown in FIG. 9.

The operation of the embodiment in FIG. 9 will be described below with reference to the timing chart in FIG. 10. When a normal operation is achieved, i.e., when the drive device 2 is driven by the command of the command device 17, the contacts 18a–18c are normally opened, and the AC output of the power source 1 is not supplied to the induction motor 11. When the elevator is operating, the contacts 19a–19c are closed by the command of the operation command generator 14 of the command device 17, a voltage is applied to the motor 11, a pushing force is applied to the cage door 10 disposed at the closed position, and the cage door 10 is effectively closed.

Figure 11:
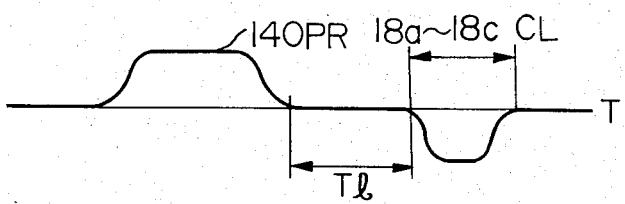

When the cage is stopped in the zone capable of opening the door but the door is not opened, a detector which detects the stoppage of the cage in the zone capable of opening the door is operated as shown in FIG. 11, a timer is operated by a signal from the detector, the electromagnet is energized by the signal from the timer after a predetermined period of time is elapsed, and the contactors 18a–18c are closed. In this manner, the motor 11 is opened, thereby opening the door, and passengers are not enclosed in the cage of the elevator.

Therefore, according to the embodiment in FIG. 9, the contacts 18a–18c and 19a–19c are not simultaneously closed.

The drive devices 2 of the above-mentioned embodiments may be applied to both the motor primary voltage controller and the variable voltage and variable frequency power source via thyristors.

According to the present invention, as mentioned above, the winding induction motor and the door induction motor are commonly connected to the drive device connected to the AC power source and are independently controlled Therefore, the exclusive device for controlling the door induction motor can be eliminated, thereby simply and inexpensively constructing the apparatus.

Furthermore, the voltage is applied to the door induction motor via the contacts irrespective of the drive device during the running of the cage, and the pushing force is applied to the cage door disposed at the closed position. Therefore, the cage door may not be opened during the running of the cage, thereby improving the safety of the elevator.

Moreover, when the cage is stopped in the zone capable of opening the door of the floor of the story and a predetermined period of time has elapsed but the door is not opened, the door induction motor is connected via the contacts to the power source and the cage door is driven toward the door opening direction. Therefore, the cage door can be effectively opened, and passengers can be prevented from being enclosed in the cage.

TABLE I

| INPUT | | | OUTPUT | | | | | |
|---|---|---|---|---|---|---|---|---|
| A | B | C | $Q_0$ | $Q_1$ | $Q_2$ | $Q_3$ | $Q_4$ | $Q_5$ |
| 0 | 0 | 0 | 1 | 0 | 0 | 0 | 0 | 0 |
| 0 | 0 | 1 | 0 | 1 | 0 | 0 | 0 | 0 |
| 0 | 1 | 0 | 0 | 0 | 1 | 0 | 0 | 0 |
| 0 | 1 | 1 | 0 | 0 | 0 | 1 | 0 | 0 |
| 1 | 0 | 0 | 0 | 0 | 0 | 0 | 1 | 0 |
| 1 | 0 | 1 | 0 | 0 | 0 | 0 | 0 | 1 |

What is claimed:

1. An apparatus for controlling an AC powered elevator comprising:
   a three-phase AC power source;
   a drive device connected to said three-phase AC power source for converting an AC signal into an AC power having a variable frequency, thereby enabling the controlling of an induction motor;
   a winding induction motor connected to and controlled by said drive device for driving the elevator's cage;
   a door induction motor connected to and controlled by said drive device for opening and closing a cage door provided at the cage of the elevator;
   a motor control command device having an operation command generator which generates a command for starting and stopping the cage of the elevator so as to control said drive device and a door command generator which generates a command for opening and closing the cage door so as to control said drive device for independently controlling the winding induction motor and the door induction motor; and
   at least one contact connected between said AC power source and said door induction motor for applying a voltage to said door induction motor irrespective of said drive device during the running of said cage for thereby applying a pushing force to said cage door when disposed at its closed position.

2. An apparatus for controlling an AC powered elevator as set forth in claim 1, wherein said at least one door closing contact is connected in series with a current limiting resistor.

3. An apparatus for controlling an AC powered elevator as set forth in claim 2, wherein said at least one door closing contact is the contact of an electromagnetic contactor which is operated by the command of said operation command generator.

4. An apparatus for controlling an AC powered elevator as set forth in claim 1, wherein:
   said motor control command device switches the connection of said drive device to said winding induction motor and the connection of said drive device to said door induction motor.

5. An apparatus for controlling an AC powered elevator as set forth in claim 4, wherein:
   the connection of said drive device to said winding induction motor is performed by a first contact and the connection of said drive device to said door induction motor is performed by a second contact.

6. An apparatus for controlling an AC powered elevator as set forth in claim 5, wherein:
   said first contact is closed and said second contact is opened by a command from said operation command generator so as to control said drive device, thereby operating said winding induction motor.

7. An apparatus for controlling an AC powered elevator as set forth in claim 6, wherein:
   said first contact is opened and said second contact is closed by a command from said door command generator so as to control said drive device, thereby operating said door induction motor.

8. An apparatus for controlling an AC powered elevator as set forth in claim 1, wherein:
   said drive device comprises a rectifier connected to said three-phase AC power source for rectifying an output of said three-phase AC power source into a DC voltage, a capacitor connected to an output of said rectifier for smoothing said output of said rectifier, and an inverter for converting the DC output smoothed by said capacitor into an AC power having a variable frequency.

9. An apparatus for controlling an AC powered elevator as set forth in claim 8, wherein:
   said operation command generator and said door command generator generate commands for controlling said inverter of said drive device.

10. An apparatus for controlling an AC powered elevator comprising:
    a three-phase AC power source;
    a drive device connected to said three-phase AC power source for converting an AC signal into an AC power having a variable frequency, thereby enabling the controlling of an induction motor;
    a winding induction motor connected to and controlled by said drive device for driving the elevator's cage;
    a door induction motor connected to and controlled by said drive device for opening and closing a cage door provided at the cage of the elevator;
    a motor control command device having an operation command generator which generates a command for starting and stopping the cage of the elevator so as to control said drive device and a door command generator which generates a command for opening and closing the cage door so as to control said drive device for independently controlling the winding induction motor and the door induction motor; and
    at least one door opening contact connected between said AC power source and said door induction motor for driving said door induction motor in the cage door opening direction irrespective of said drive device when said cage has stopped in a zone capable of opening the door of the floor of a story and a predetermined period of time has elapsed without said door being opened.

11. An apparatus for controlling an AC powered elevator as set forth in claim 10, wherein said at least one door opening contact is a contact of an electromagnetic contactor energized by a timer operated by a detector for detecting the stoppage of said cage in said zone capable of opening the door of the floor of a story.

* * * * *